United States Patent Office 3,147,750
Patented Sept. 8, 1964

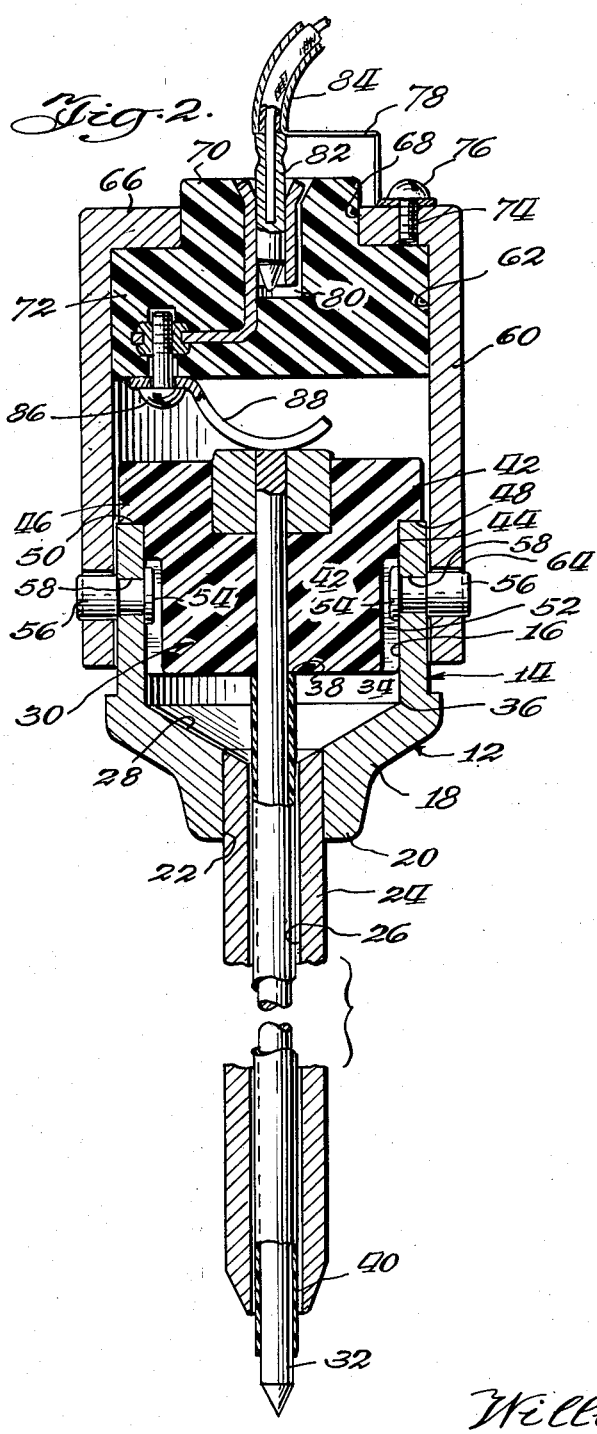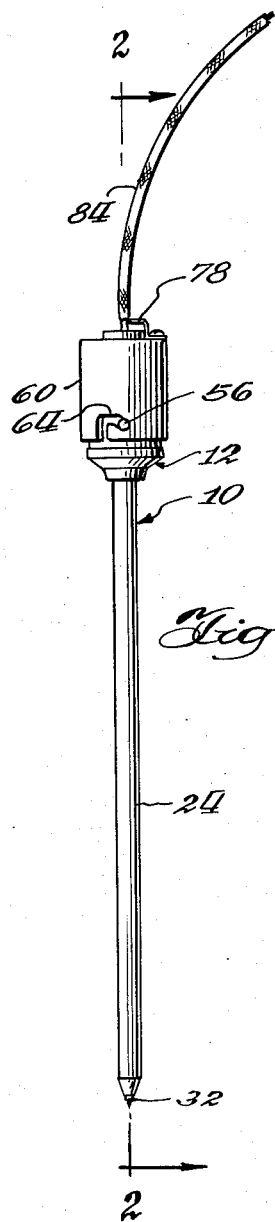

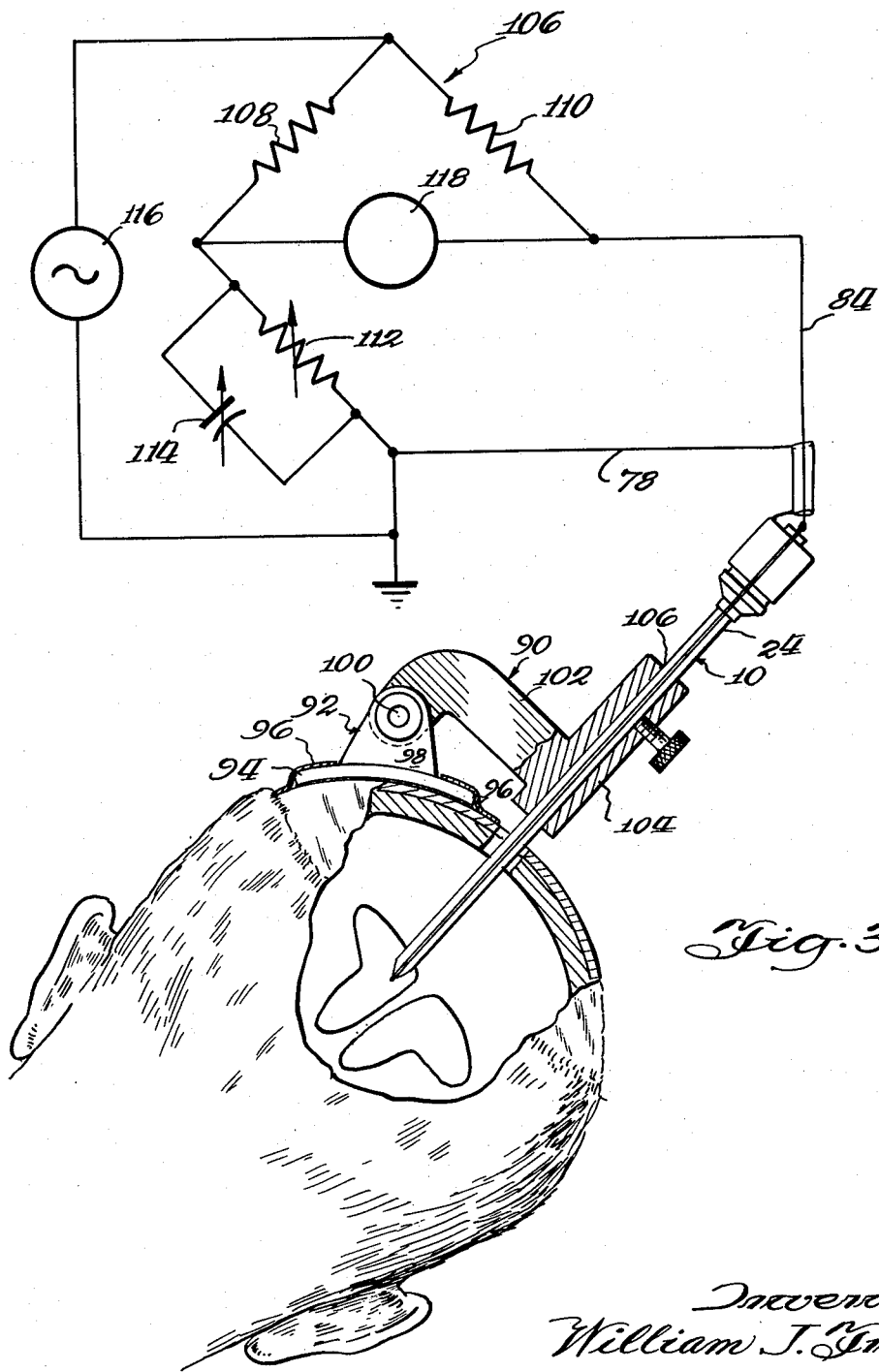

3,147,750
TISSUE INTERFACE DETECTOR FOR VENTRICULOGRAPHY AND OTHER APPLICATIONS
William J. Fry, Champaign, Ill., assignor to Altair Corporation, Champaign, Ill., a corporation of Illinois
Filed May 18, 1962, Ser. No. 195,723
4 Claims. (Cl. 128—2.1)

This invention constitutes a method for determining when the end of a penetrating instrument passes through the interface between two types of tissue or between tissue and a fluid filled space. In particular, it is appropriate for determining the moment at which a surgical attendant penetrates the ventricular wall of the brain to enter the cerebrospinal fluid.

Heretofore, when inserting a cannula through the brain matter for providing a means of introducing air, radio-opaque medium or other material into the ventricular system it was necessary that the operator either determine by feel that the cannula had penetrated the ventricular wall or determine this event by observing the flow of cerebrospinal fluid out of the open end of the cannula. In human neurosurgery, these signs are sometimes not evident and in the case of experimental animals, such as cats and the like, these signs are almost always absent. According to the present invention, means are provided for indicating a definitive penetration of the ventricular wall. In human work, a cannula of less diameter than that usually employed may be utilized since there is no need by the operator to attempt to feel the penetration of the ventricular wall. This constitutes an advantage since the use of a cannula of limited diameter causes less disturbance and destruction of brain tissue.

Basically, the system of the present invention involves the provision of means for detecting a change in electrical impedance when a pair of electrodes penetrates a tissue interface. This system would also be useful in locating any fluid-filled space in tissue and also can be used generally to indicate the passage of a cannula or probe through regions of transition between tissue structures of different impedance characteristics.

In the drawings:

FIGURE 1 is an elevational view of a cannula assembly forming a part of the present invention;

FIGURE 2 is a greatly enlarged broken away sectional view taken substantially on line 2—2 of FIGURE 1; and FIGURE 3 is a diagrammatic view, partly in section, showing the cannula assembly of the present invention in the position it assumes after penetration of the ventricular wall and showing the impedance indicating circuit schematically.

Referring to the drawings, and more particularly to FIGURES 1 and 2, the detector system of the present invention includes a cannula assembly, indicated generally by reference numeral 10, and having a body portion 12 having a cylindrical section 14 formed with a bore 16. The section 14 is integral with a conical section 18 with which is integrally formed a boss 20. The boss 20 is formed with a bore 22 within which is received one end of a ventricular needle 24 having a bore 26 communicating with a conical bore 28 which affords communication between the bore 16.

An electrode assembly 30 is received within the body portion 12 and has an electrode 32 extending into the ventricular needle 24. The assembly 30 includes a bearing disk 34 which, in the position illustrated in FIGURE 2, rests in abutment against a shoulder 36 formed in the intersection of the bore 16 and the bore 28. The disk 34 has an opening 38 for reception of the electrode 32 and an insulating sleeve 40 surrounding the electrode 32 for a purpose hereafter described. The assembly 30 further includes an insulator block 42, of cylindrical configuration, and having a cylindrical portion 44 snugly received in bore 16. In addition, the block 42 has a portion 46 of greater diameter than the portion 44 so as to form a shoulder 48 overlying the end cylindrical edge 50 of the cylindrical section 14 of the body portion 12, and a portion 52, of less diameter than the portion 44, to afford room for heads 54 of rivets 56 which extend through diametrically opposed openings 58 in the portion 14.

The cannula assembly 10 further includes a cylindrical cap portion 60 having a bore 62 for telescopic reception of the electrode assembly 30. The cap 60 is formed with a pair of bayonet slots 64 for reception of the outer ends of the rivets 56 to effect a locking engagement with the section 14 of the body portion 12. The cap 60 is formed with an end 66 provided with a central opening 68 through which projects a reduced end portion 70 of an insulating block 72 and a threaded opening 74 for reception of a cap screw 76 which is electrically connected to an insulated ground conductor 78. It is important that a concentric electrical lead be used to connect the cannula assembly to the electric circuitry since shielding of the non-grounded electrode is essential to eliminate electrical pickup from the environment including the operator and equipment.

Within the insulating block 72 is formed a spring socket 80 for locking reception of a terminal lug 82 which is electrically connected to an insulated conductor 84. The socket 80 is electrically connected to a screw 86 which in turn is electrically connected to a spring contact 88. As shown best in FIGURE 2, the spring contact 88 is disposed in conductive relation to the upper end of the electrode 32 when the electrode assembly is in operative relation with respect to the cap 60.

In FIGURE 3, the cannula assembly 10 is illustrated in operative relation to the remainder of the system which includes a cannula guide, indicated generally by reference numeral 90, which includes a base 92 having an arcuate plate 94 adapted to be secured to the scalp of the patient by means of strips of tape 96. The base 92 also includes an ear 98, secured to the plate 94 and suitably apertured for reception of a screw 100, on which is journaled a pivotal support 102, in the form of a bell crank, for a guide tube 104.

The conductors 78 and 84 connect the cannula assembly 10 to a bridge 106 having fixed resistors 108 and 110, a variable resistor 112 and a variable capacitor 114 in parallel relation to the variable resistor 112. A power source 116, preferably in the order of 1000 cycles per second, supplies power to the circuit. A meter 118 is provided to indicate variations from a null produced by piercing of the ventricular wall by the cannula assembly 10. The null may be effected by suitable adjustment of the resistor 112 and the capacitor 114.

When the cannula assembly has been inserted into the ventricle and this fact is indicated by the meter 118, the cap 60 may then be removed along with the electrode assembly 30. The hollow needle 24 may then be utilized to insert the desired medium into the ventricular cavity. The power level at which the system operates is selected so as to be nonstimulating and nondestructive to tissue. Alternating current is employed to minimize polarization effects. It will be appreciated that the current flowing under the voltage applied is a measure of the impedance of the tissue between the tip of the electrode 32 and the hollow needle 24. The bridge 106 may, of course, be balanced with the tip of the electrode 32 in the cerebrospinal fluid and variation from the null may then be noted as the tip penetrates and enters soft tissue. It will be appreciated that the particular circuit providing the indicating means is merely illustrative of a number of circuits suitable for use in exhibiting impedance changes.

The passage of the cannula assembly through an interface may be accomplished by detecting a change in phase of the current of the complex impedance without any change in the amplitude in the impedance.

The foregoing detailed description has been given for clearness of understanding only, and no unnecessary limitations should be understood therefrom, as modifications will be obvious to those skilled in the art.

What is claimed is:

1. A detector for neurosurgical procedures comprising a cannula assembly having a substantially cylindrical body member with an enlarged internal bore terminating in a substantially frusto-conical bore, a hollow ventricular needle member secured to and protruding into the frusto-conical section of the bore in communicating relationship therewith, a cap member adapted to enclose the cylindrical end of the cannula and to be secured thereto, an insulating member supported within the closed end portion of the said cap, means to establish an electrical connection through the insulating member and the cap to an external circuit, means to connect the cap member also to an external circuit, a second insulating member adapted to be removably positioned within the cylindrical portion of the cannula and telescopically received within the said cap member, an electrode element supported within the last-named insulating member and extending outwardly therefrom in a direction internally of the hollow ventricular needle, an insulating member surrounding said electrode for that portion thereof which is adapted to extend through the ventricular needle to electrically insulate it from the needle, the cylindrical body and the cap, means provided by the cylindrical cannula member for supporting the last-named insulating element and the electrode member supported thereby within the cylindrical portion of the cannula so as to be tightly fitted therein and yet removable therefrom, and means for establishing an electrical connection between the electrode member supported by the second-named insulating member and the electrical connection through the first insulating member supported by the cap member, whereby the cannula and ventricular needle are adapted to provide electrode elements for determining penetration of the instrument through an interface between two types of tissue and whereby the ventricular needle, with the cap and electrode assembly removed, is adapted to provide a passageway for bi-directional passage from and to the penetrated region of the interface.

2. A detector for neurosurgical procedures comprising a cannula assembly having a substantially cylindrical body member with an enlarged internal bore terminating in a substantially frusto-conical bore, the cylindrical body terminating in a hollow ventricular needle member, an electrically conducting cap member adapted to telescopically receive the substantially cylindrical section of the cannula, means to fasten the cap at substantially its bottom portion to the cylindrical portion of the cannula in a fashion adapted for quick release, an insulating member supported within the upper portion of the said cap, means to establish an electrical connection through the insulating member and the cap to an external circuit, means to connect the cap member also to an external circuit, a second insulating member adapted to be removably positioned within the cylindrical portion of the cannula and also telescopically received within the said cap member, an electrode element supported within the last-named insulating member and extending internally of the hollow ventricular needle to protrude outwardly from the open end thereof, an insulating member surrounding said electrode for that portion thereof which is adapted to extend through the ventricular needle, means provided by the cylindrical cannula member for supporting the last-named insulating element and the electrode member supported thereby within the cylindrical portion of the cannula so as to be tightly fitted therein and yet removable therefrom, and resilient means for establishing an electrical connection between the electrode member supported by the second-named insulating member and the electrical connection through the first insulating member supported by the cap member whereby the cannula and ventricular needle are adapted to provide electrode elements for determining penetration of the instrument through an interface between two types of tissue and whereby the ventricular needle with the cap and electrode assembly removed is adapted to provide a passageway for bi-directional passage from and to the penetrated region of the interface.

3. The detector claimed in claim 2 wherein the resilient means comprises a leaf member adapted to spread the two insulating members longitudinally apart and thereby force the internal electrode outwardly of the ventricular needle member.

4. The detector claimed in claim 2 comprising, in addition, pin means secured to the cylindrical body member and extending outwardly from the periphery thereof, said cap having a bayonet slot means extending inwardly from its open end and adapted to mate with the pin means, to provide a quick-release connection between the cap and cylindrical sections.

References Cited in the file of this patent

UNITED STATES PATENTS

| 1,859,222 | Rogers | May 17, 1932 |
| 2,219,605 | Turkel | Oct. 29, 1940 |
| 2,298,506 | Parker | Oct. 13, 1942 |
| 2,377,869 | Elliott | June 12, 1945 |
| 2,437,697 | Kalom | Mar. 16, 1948 |
| 2,633,019 | Albrecht et al. | Mar. 31, 1953 |
| 2,637,316 | Grez | May 5, 1953 |
| 2,763,935 | Whaley et al. | Sept. 25, 1956 |
| 2,899,653 | Capron | Aug. 11, 1959 |
| 3,017,887 | Heyer | Jan. 23, 1962 |
| 3,098,813 | Beebe et al. | July 23, 1963 |

FOREIGN PATENTS

| 1,071,420 | France | Mar. 3, 1954 |